United States Patent
Matsumoto et al.

(10) Patent No.: US 11,932,741 B2
(45) Date of Patent: Mar. 19, 2024

(54) METHOD FOR MANUFACTURING MOLDED ARTICLE, AND COMPOSITE MATERIAL

(71) Applicant: Mitsubishi Gas Chemical Company, Inc., Tokyo (JP)

(72) Inventors: Nobuhiko Matsumoto, Hiratsuka (JP); Kousuke Ikeuchi, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 52 days.

(21) Appl. No.: 17/631,272

(22) PCT Filed: Jun. 12, 2020

(86) PCT No.: PCT/JP2020/023131
§ 371 (c)(1),
(2) Date: Jan. 28, 2022

(87) PCT Pub. No.: WO2021/019928
PCT Pub. Date: Feb. 4, 2021

(65) Prior Publication Data
US 2022/0267545 A1 Aug. 25, 2022

(30) Foreign Application Priority Data
Jul. 30, 2019 (JP) .................................. 2019-139584

(51) Int. Cl.
*C08J 5/24* (2006.01)
*B29B 15/10* (2006.01)
(Continued)

(52) U.S. Cl.
CPC ............. *C08J 5/247* (2021.05); *B29B 15/105* (2013.01); *B29C 35/045* (2013.01);
(Continued)

(58) Field of Classification Search
CPC ... B32B 27/281; B32B 27/304; B32B 27/065; B32B 27/286; B32B 27/288; B32B 5/12;
(Continued)

(56) References Cited

U.S. PATENT DOCUMENTS

2009/0309260 A1  12/2009  Keuchel
2014/0360344 A1  12/2014  Pilpel et al.
(Continued)

FOREIGN PATENT DOCUMENTS

EP   0560038 A1   9/1993
JP   H04-211734 A  8/1992
(Continued)

OTHER PUBLICATIONS

Upstart Epoxy, Resin Prep Secrets: The Best Epoxy Cure Temperature, accessed online May 18, 2023.*

(Continued)

*Primary Examiner* — Camie S Thompson
(74) *Attorney, Agent, or Firm* — Fitch, Even, Tabin & Flannery LLP (57) ABSTRACT

To provide a method for manufacturing a novel molded article using a commingled yarn and a composite material using a commingled yarn. The method for manufacturing a molded article, includes disposing a commingled yarn containing a continuous reinforcing fiber and a continuous thermoplastic resin fiber on a part of a surface of a prepreg, the prepreg containing continuous reinforcing fibers paralleling at least unidirectionally, and a thermosetting resin impregnated between the continuous reinforcing fibers, and heat-processing the prepreg with the commingled yarn.

19 Claims, 2 Drawing Sheets

(51) Int. Cl.
  *B29C 35/04* (2006.01)
  *B29C 70/20* (2006.01)
  *B29K 63/00* (2006.01)
  *B29K 77/00* (2006.01)
  *B29K 105/08* (2006.01)

(52) U.S. Cl.
  CPC ...... *B29C 70/202* (2013.01); *B29C 2035/048* (2013.01); *B29C 2945/76769* (2013.01); *B29K 2063/00* (2013.01); *B29K 2077/00* (2013.01); *B29K 2105/0872* (2013.01); *C08J 2333/24* (2013.01)

(58) Field of Classification Search
  CPC ......... B32B 5/18; C08J 5/247; C08J 2333/24; B29B 15/105; B29B 15/10; B29C 35/045; B29C 35/04; B29C 70/20; B29C 70/202; B29C 2035/048; B29K 2945/76769; B29K 2063/00; B29K 2077/00; B29K 2105/0872; B29K 77/00; B29K 105/08
  USPC .... 156/60; 428/114, 426, 435, 299.1, 299.7, 428/299.4, 298.1, 300.4, 297.1, 364
  See application file for complete search history.

(56) References Cited

U.S. PATENT DOCUMENTS

| | | |
|---|---|---|
| 2017/0028601 A1 | 2/2017 | Soni et al. |
| 2017/0232702 A1 | 8/2017 | Hayashi et al. |
| 2018/0126674 A1 | 5/2018 | Ohtani et al. |

FOREIGN PATENT DOCUMENTS

| | | |
|---|---|---|
| JP | H05-269873 A | 10/1993 |
| JP | 2012-154364 A | 8/2012 |
| JP | 2016-196624 A | 11/2016 |
| JP | 2017-513733 A | 6/2017 |
| JP | 2019-099955 A | 6/2019 |
| WO | 2015/157175 A1 | 10/2015 |
| WO | 2016/017080 A1 | 2/2016 |
| WO | 2016/159340 A1 | 10/2016 |

OTHER PUBLICATIONS

Resin Designs, 5 Important Reasons Why You Should be Mindful of Glass Transition Temperatures When Selecting an Epoxy Adhesive, accessed online May 18, 2023.*

International Preliminary Report on Patentability and Written Opinion for PCT/JP2020/023131, dated Sep. 1, 2020, and English Translation submitted herewith (8 pages).

International Search Report for PCT/JP2020/023131, dated Sep. 1, 2020, and English Translation submitted herewith (5 pages).

Extended European Search Report issued in corresponding European Application No. 20846004.8 dated Aug. 17, 2022 (6 pages).

* cited by examiner

METHOD FOR MANUFACTURING MOLDED ARTICLE, AND COMPOSITE MATERIAL

CROSS-REFERENCE TO RELATED APPLICATIONS

This application is a U.S. national phase application filed under 35 U.S.C. § 371 of International Application Number PCT/JP2020/023131, filed Jun. 12, 2020, designating the United States, which claims priority from Japanese Application Number 2019-139584, filed Jul. 30, 2019.

Field of the Invention

The present invention relates to a method for manufacturing a molded article and to a composite material. In particular, the present invention relates to a molded article and a composite material suitable for manufacturing a seat sheet.

BACKGROUND OF THE INVENTION

Commingled yarn manufactured by using a thermoplastic resin fiber and a continuous reinforcing fiber has been investigated. Commingled yarn is, for its advantageous supple characteristics, suitably used in molded articles of intricate shapes, and in molded articles particularly requiring strength.

In addition, another example for application of commingled yarn includes manufacture of molded articles with commingled yarn stitch (tailored-fiber placement). Specifically, Patent Document 1 discloses a composite material including a commingled yarn containing a continuous reinforcing fiber (A) and a thermoplastic resin fiber (B) as fiber components, the commingled yarn being arranged in a thermoplastic resin film, in which a thermoplastic resin fiber (C) is used to keep the commingled yarn in place.

CITATION LIST

Patent Documents

Patent Document 1: JP 2016-196624 A

SUMMARY OF INVENTION

The commingled yarn stitch stated above is an excellent material, but in some instances, the commingled yarn stitch is desirably used in combination with another material as opposed to using it by itself for an entire portion of a molded article. Such an instance includes a case of manufacturing a large molded article, and a case of a molded article in which a portion that requires high mechanical properties is partial. However, no composite materials or manufacturing methods suitable for such circumstances are known.

An object of the present invention is to solve such problems and to provide a method for manufacturing a novel molded article using a commingled yarn and to provide a composite material using the same.

As a result of studies conducted by the present inventor to solve the above problems, the problems have been solved by the following means.

(1) A method for manufacturing a molded article, including disposing a commingled yarn containing a continuous reinforcing fiber and a continuous thermoplastic resin fiber on a part of a surface of a prepreg, the prepreg containing continuous reinforcing fibers paralleling at least unidirectionally, and a thermosetting resin impregnated between the continuous reinforcing fibers, and heat-processing the prepreg with the commingled yarn.

(2) The method for manufacturing a molded article according to (1), further including, after disposing the commingled yarn, fixing the commingled yarn on the surface of the prepreg by using a thread-like material, and subsequently carrying out the heat-processing.

(3) The method for manufacturing a molded article according to (1) or (2), wherein a melting point of a thermoplastic resin fiber constituting the continuous thermoplastic resin fiber is higher than a curing temperature of the thermosetting resin, the melting point being a peak top temperature of an endothermic peak observed by differential scanning calorimetry during melting of a 1 mg sample of the thermoplastic resin fiber by heating the sample from room temperature to 300° C. at a heating rate of 10° C./min under a stream of nitrogen gas flowing at 30 mL/min.

(4) The method for manufacturing a molded article according to any one of (1) to (3), wherein a glass transition temperature of a thermoplastic resin fiber constituting the continuous thermoplastic resin fiber is lower than a curing temperature of the thermosetting resin, the glass transition temperature being measured by differential scanning calorimetry during heating of a 1 mg sample of the thermoplastic resin fiber to 300° C. at a heating rate of 10° C./min under a stream of nitrogen gas flowing at 30 mL/min, and followed by immediate cooling of the sample to room temperature or lower, heating again from room temperature to 300° C. at a heating rate of 10° C./min.

(5) The method for manufacturing a molded article according to any one of (1) to (4), wherein a difference between the glass transition temperature of the thermoplastic resin constituting the continuous thermoplastic resin fiber and a glass transition temperature of the thermosetting resin is from 15 to 200° C.

(6) The method for manufacturing a molded article according to any one of (1) to (5), wherein the prepreg contains continuous reinforcing fibers paralleling bidirectionally, and a thermosetting resin impregnated between the continuous reinforcing fibers.

(7) The method for manufacturing a molded article according to any one of (1) to (6), wherein the thermosetting resin is an epoxy resin.

(8) The method for manufacturing a molded article according to any one of (1) to (7), wherein the continuous reinforcing fibers contained in the prepreg contain at least one of: a carbon fiber or a glass fiber.

(9) The method for manufacturing a molded article according to any one of (1) to (8), wherein the reinforcing fiber contained in the commingled yarn contains at least one kind of a carbon fiber and a glass fiber.

(10) The method for manufacturing a molded article according to any one of (1) to (9), wherein the continuous thermoplastic resin fiber contained in the commingled yarn contains a polyamide resin.

(11) The method for manufacturing a molded article according to any one of (1) to (9), wherein the continuous thermoplastic resin fiber contained in the commingled yarn contains a polyamide resin containing a structural unit derived from a diamine and a structural unit derived from a dicarboxylic acid, and 50 mol % or more of the structural unit derived from a diamine is derived from xylylenediamine and 50 mol % or more of the structural unit derived from a dicarboxylic acid is derived from an α,ω-linear aliphatic dicarboxylic acid having from 4 to 20 carbons.

(12) The method for manufacturing a molded article according to any one of (1) to (11), wherein at least a part of the commingled yarn is disposed on the surface of the prepreg to give a radius of curvature of 100 cm or less.

(13) The method for manufacturing a molded article according to any one of (1) to (12), wherein the molded article is a seat sheet.

(14) A composite material, including a commingled yarn containing a continuous reinforcing fiber and a continuous thermoplastic resin fiber, the commingled yarn being disposed on a part of a surface of a prepreg, the prepreg containing continuous reinforcing fibers paralleling at least unidirectionally and a thermosetting resin impregnated between the continuous reinforcing fibers.

(15) The composite material according to (14), wherein the commingled yarn is fixed on the surface of the prepreg by using a thread-like material.

The present invention has made it possible to provide a method for manufacturing a novel molded article by using a commingled yarn and a composite material using the same. In particular, the present invention has made it possible to provide a manufacturing method preferably applicable to manufacturing a large molded article, or to a molded article in which a portion that requires high mechanical properties is partial.

DESCRIPTION OF EMBODIMENTS

Contents of the present invention will be described in detail below. In the present specification, "from . . . to . . . " or "of . . . to . . . " is used to mean that the numerical values described before and after "to" are included as the lower limit and the upper limit, respectively.

A method for manufacturing a molded article of the present invention includes disposing a commingled yarn containing a continuous reinforcing fiber and a continuous thermoplastic resin fiber on a part of a surface of a prepreg, the prepreg containing continuous reinforcing fibers paralleling at least unidirectionally and a thermosetting resin impregnated between the continuous reinforcing fibers; and heat-processing the prepreg with the commingled yarn. The method thus constituted can be preferably used in a case of manufacturing a large molded article or in a case of a molded article that requires high mechanical properties is partial.

Prepreg

In the method for manufacturing a molded article according to the present invention, a prepreg containing continuous reinforcing fibers paralleling at least unidirectionally and a thermosetting resin impregnated between the continuous reinforcing fibers is used. In the molded article of the present invention, the prepreg typically serves as a substrate, and using the prepreg enables to produce a molded article having a large area and maintaining the required mechanical strength with high productivity. That is, in the prepreg used in the present invention, the thermosetting resin is not completely cured, but the thermosetting resin (containing an additive, which is blended as necessary) is impregnated between the continuous reinforcing fibers, heated and/or dried to a semi-cured state. "Semi-cured" means a state where the thermoplastic resin remains to be further cured by a curing process in the heating step described later.

The prepreg used in the present invention is preferably a prepreg containing continuous reinforcing fibers paralleling bidirectionally and a thermosetting resin impregnated between the continuous reinforcing fibers. In the present invention, only one prepreg may be used, or a plurality of prepregs may be used in layers.

Hereinafter, the present invention will be described in detail.

Continuous Reinforcing Fiber

The prepreg used in the present invention contains continuous reinforcing fibers. "Continuous reinforcing fibers paralleling at least unidirectionally" means that the reinforcing fibers are continuously present in juxtaposition from any one end to another end of the prepreg. Note that, those in which reinforcing fibers are spun into continuous reinforcing fibers are considered as those in which the reinforcing fibers are continuously present. Examples of the continuous reinforcing fibers paralleling at least unidirectionally include roving reinforcing fibers, woven fabrics of reinforcing fibers, and braids of reinforcing fibers.

The length of the continuous reinforcing fiber is determined according to the shape of a molded article, and for example, a number average fiber length is 3 cm or more, or typically 10 cm or more. The upper limit value may be, for example, 100 m or less.

The continuous reinforcing fiber is not limited, and any continuous reinforcing fiber that is applicable to this type of technologies can be appropriately selected and used. The continuous reinforcing fiber is exemplified by a plant fiber, a carbon fiber, a glass fiber, an alumina fiber, a boron fiber, a ceramic fiber, and an aramid fiber, and is preferably at least one of: a carbon fiber or a glass fiber.

For the carbon fiber, a wide variety of known carbon fibers can be adopted, and for example, a polyacrylonitrile-based carbon fiber or a pitch-based carbon fiber can be preferably used. In addition, a carbon fiber made from a plant-derived raw material, such as lignin or cellulose, can also be used.

For the glass fiber, a fiber obtained by melt spinning glass, such as E glass, C glass, A glass, S glass, and alkali-resistant glass, which are ordinarily supplied, is used, but in the present invention, E glass is preferably contained.

The cross section of the continuous reinforcing fiber may be either circular or non-circular.

When the continuous reinforcing fiber is carbon fiber, the tensile strength is preferably 1500 MPa or more, more preferably 2500 MPa or more, and even more preferably 3500 MPa or more. The upper limit value is not specifically limited, but is practically 8000 MPa or less. For the glass fiber, the tensile strength is preferably 800 MPa or more, more preferably 1800 MPa or more, and even more preferably 2800 MPa or more. The upper limit value is not specifically limited, but is practically 5000 MPa or less.

The continuous reinforcing fibers parallel at least unidirectionally and preferably parallel bidirectionally. The state of unidirectionally paralleling is exemplified by the case of spreading continuous reinforcing fiber rovings, and the state of bidirectionally paralleling is exemplified by woven fabrics and braids.

The woven fabric is exemplified by woven fabrics having the warp and weft (such as a plain weave, a twill weave, and a satin weave) and non-crimp woven fabrics. Using a woven fabric having the warp and weft tends to improve the stitching properties and also improve the mechanical strength. On the other hand, using a non-crimp woven fabric tends to further improve the mechanical strength.

The braids are exemplified by the ones having a structure in which the fibers are aligned at ±45 degrees, a structure in which the fibers are aligned at 0 degrees and ±60 degrees, and a structure in which the fibers are aligned at 0 degrees, ±45 degrees, and 90 degrees. The braids composed of more angles of alignment tends to be more isotropic.

For the proportion of the continuous reinforcing fibers in the prepreg, the lower limit value is preferably 35 mass % or higher and more preferably 45 mass % or higher. In addition, the upper limit value is preferably 85 mass % or lower and more preferably 75 mass % or lower.

For the proportion of the continuous reinforcing fibers in the prepreg, the lower limit value is preferably 30 vol. % or higher and more preferably 40 vol. % or higher. In addition, the upper limit value is preferably 80 vol. % or lower and more preferably 70 vol. % or lower.

The prepreg may contain only one type of continuous reinforcing fiber or may contain two or more types of continuous reinforcing fibers. In the prepreg containing two or more types of continuous reinforcing fibers, the total amount of the continuous reinforcing fibers is preferably within the above range.

The prepreg has a ratio of impregnation of the thermosetting resin between the continuous reinforcing fibers of preferably 90% or higher, more preferably 95% or higher, and even more preferably 98% or higher. The upper limit value is preferably 100%.

The ratio of impregnation is measured in accordance with a method described in Examples below.

Thermosetting Resin

The thermosetting resin is any resin curable by heat and not specifically limited, and can be exemplified by urethane-based polymers, acrylic polymers, vinyl acetate-based polymers, vinyl chloride-based polymers, polyester-based polymers, and copolymers thereof; and epoxy resins, phenolic resins, cyanate resins, melamine resins, urea resins, and thermosetting polyimides; and preferably an epoxy resin, a urethane polymer, and a cyanate resin, and more preferably an epoxy resin.

Details of the epoxy resin can be referred to the descriptions in paragraphs [0035] to [0042] of JP 6439901 B, the contents of which are incorporated in the present specification by reference. In addition, an alicyclic epoxy resin having a hydrogenated bisphenol A backbone or a Celloxide backbone can be used.

In particular, when a polyamide resin fiber is used in the commingled yarn, from the viewpoint of compatibility, epoxy resins, urethane polymers, and cyanate resins are preferred, and epoxy resins are more preferred.

The thermosetting resin has a lower limit value of the glass transition temperature of preferably 80° C. or higher, more preferably 90° C. or higher, and even more preferably 98° C. or higher. The thermosetting resin with a glass transition temperature not lower than the lower limit value described above can further improve the usable temperature range. In addition, the upper limit value is preferably 250° C. or lower, more preferably 200° C. or lower, and further may be 140° C. or lower, 135° C. or lower, or 130° C. or lower. The thermosetting resin with a glass transition temperature not higher than the upper limit value described above tends to further improve adhesion with the commingled yarn containing a continuous reinforcing fiber and a continuous thermoplastic resin fiber, the commingled yarn to be disposed on the surface of the prepreg. The glass transition temperature is measured according to a method described in Examples below.

For the prepreg containing two or more thermosetting resins, the glass transition temperature is the temperature of the lower one of glass transition temperatures to be detected. Hereinafter, the glass transition temperature and melting point of the resin will be considered in the same manner.

For the proportion of the thermosetting resin in the prepreg, the lower limit value is preferably 15 mass % or higher and more preferably 20 mass % or higher. In addition, the upper limit value is preferably 55 mass % or lower and more preferably 65 mass % or lower.

The prepreg may contain only one type of thermosetting resin or may contain two or more types of thermosetting resins. In the prepreg containing two or more types of thermosetting resins, the total amount of the thermosetting resins is preferably in the above range.

The prepreg may contain a component other than the continuous reinforcing fibers and the thermoplastic resin. Specifically, examples of such a component include fillers, metal powders, antioxidants, ultraviolet absorbers, flame retardants, release agents, plasticizers, curing catalysts, curing aids, pigments, light resistant agents, antistatic agents, antibacterial agents, conductive agents, and dispersants. Examples of the curing aid include imidazole compounds, tertiary amine compounds, organic phosphorus compounds, magnesium oxide, phenol, organic acids, and metal catalysts.

Commingled Yarn

In the method for manufacturing a molded article of the present invention, a commingled yarn containing a continuous reinforcing fiber and a continuous thermoplastic resin fiber is disposed on a part of a surface of a prepreg. Disposing the commingled yarn on the surface of the prepreg can effectively reinforce the portion where particularly high strength is required. In particular, even for a thread-like material, using a material that is impregnated to a great extent would lead to a failure, such as breaking, when the material is disposed on the surface of the prepreg and would fail to obtain a good molded article, but using the commingled yarn enables the material to be molded into a desired shape. Among others, the commingled yarn is supple and thus can be more easily applied even to a shape with a small radius of curvature. Furthermore, the commingled yarn contains the continuous thermoplastic resin fiber, and this can increase the adhesion with the prepreg. In addition, the commingled yarn contains the continuous thermoplastic resin fiber, and this enables the fiber content in each region of the resulting molded article to be more uniform than disposing only a carbon fiber. Moreover, using the commingled yarn further improves reeling operation and can make the thermoplastic resin less likely to deposit on a manufacturing device even when the device is operated over a long period.

The commingled yarn mean a commingled yarn containing continuous reinforcing fibers and continuous thermoplastic resin fibers, in which the continuous reinforcing fibers are dispersed in the continuous thermoplastic resin fibers, and yet some or all of the continuous thermoplastic resin fibers are not impregnated between the continuous reinforcing fibers, maintaining the fiber state.

For the proportion of the continuous reinforcing fiber in the commingled yarn, the lower limit value is preferably 35 mass % or higher and more preferably 45 mass % or higher. In addition, the upper limit value is preferably 75 mass % or lower and more preferably 65 mass % or lower.

Furthermore, for the proportion of the continuous reinforcing fiber in the commingled yarn, the lower limit value is preferably 30 vol. % or higher and more preferably 40 vol. % or higher. In addition, the upper limit value is preferably 70 vol. % or lower and more preferably 60 vol. % or lower.

The commingled yarn may contain only one type of continuous reinforcing fiber or may contain two or more types of continuous reinforcing fibers. In the commingled yarn containing two or more types of continuous reinforcing fibers, the total amount of the continuous reinforcing fibers is preferably in the above range.

For the proportion of the continuous thermoplastic resin fiber in the commingled yarn, the lower limit value is preferably 25 mass % or higher and more preferably 35 mass % or higher. In addition, the upper limit value is preferably 65 mass % or lower and more preferably 55 mass % or lower.

The commingled yarn may contain only one type of continuous thermoplastic resin fiber or may contain two or more types of continuous thermoplastic resin fibers. In the commingled yarn containing two or more types of continuous thermoplastic resin fibers, the total amount of the continuous thermoplastic resin fibers is preferably in the above range.

In the commingled yarn, the total of continuous reinforcing fiber and continuous thermoplastic resin fiber preferably accounts for 80 mass % or higher of the commingled yarn, more preferably accounts for 90 mass % or higher, even more preferably accounts for 95 mass % or higher, and still more preferably accounts for 98 mass % or higher.

The degree of dispersion of the continuous reinforcing fiber of the commingled yarn is preferably 60% or higher, more preferably 63% or higher, even more preferably 68% or higher, and may be 70% or higher, 80% or higher, or higher than 90%. In addition, the degree of dispersion is ideally 100% but may be 99% or lower. The continuous reinforcing fiber with a degree of dispersion in such a range facilitates the impregnation of the continuous reinforcing fiber and the continuous thermoplastic resin fiber and also can further reduce voids in the resulting molded article. The degree of dispersion is measured according to a description in Examples below.

The ratio of impregnation of the continuous thermoplastic resin fiber in the commingled yarn is typically 20% or lower. The upper limit of the ratio of impregnation is preferably 10% or lower, more preferably 5% or lower, even more preferably 3% or lower, and still more preferably 1% or lower. The lower limit may be 0%, but even with the ratio of impregnation of the continuous thermoplastic resin fiber 0.1% or higher, the commingled yarn has no problem in practical use. The ratio of impregnation of the commingled yarn is measured according to a description in Examples below.

The commingled yarn used in the present invention is preferably a commingled yarn obtained by bundling a continuous reinforcing fiber and a continuous thermoplastic resin fiber with a treatment agent for at least one of the continuous reinforcing fiber or the continuous thermoplastic resin fiber. The treatment agent for the continuous reinforcing fiber can be referred to the descriptions in paragraphs [0075] to [0078] of WO 2014/132776, the contents of which are incorporated in the present specification by reference. In addition, the treatment agent for the continuous thermoplastic resin fiber can be referred to descriptions in paragraph [0021] of WO 2014/132776, the contents of which are incorporated in the present specification by reference.

Furthermore, the commingled yarn can be referred to descriptions of WO 2014/132776 and WO 2016/039242 as long as they do not depart from the spirit of the present invention, and the contents of which are incorporated in the present specification by reference.

Continuous Thermoplastic Resin Fiber

The continuous thermoplastic resin fiber used in the present invention contains a continuous thermoplastic resin fiber. The thermoplastic resin fiber means that fibers of the thermoplastic resin fiber are continuously present from an end to another end in the longitudinal direction of the commingled yarn. Those in which thermoplastic resin fibers are spun into a continuous thermoplastic resin fiber are included in those in which fibers of the thermoplastic resin fiber are continuously present.

Thus, although the length of the continuous thermoplastic resin fiber is determined according to the shape of the molded article, the continuous thermoplastic resin fiber refers, for example, to a thermoplastic resin fiber with a number average fiber length of 3 cm or more or typically 10 cm or more. The upper limit may be, for example, 100 in or less.

The type of the thermoplastic resin used in the continuous thermoplastic resin fiber contained in the commingled yarn can be selected according to the application or the like. For the thermoplastic resin used in the present invention, a thermoplastic resin, such as the following, can be used: a polyolefin resin, such as a polyethylene or a polypropylene; a polyamide resin; a polyester resin, such as a poly(ethylene terephthalate) or a poly(butylene terephthalate); a polycarbonate resin; a poly(oxymethylene) resin; a poly(ether ketone) resin, such as a poly(ether ketone), a poly(ether ether ketone), a poly(ether ketone ketone), or a poly(ether ether ketone ketone); a poly(ether sulfone) resin; a poly(ether sulfide) resin; a thermoplastic polyimide resin, such as a thermoplastic poly(ether imide), a thermoplastic poly(amide imide), a wholly aromatic polyimide, or a semi-aromatic polyimide. A polyamide resin, a polycarbonate resin, or a thermoplastic polyimide resin is preferred, a polyamide resin or a polycarbonate resin is more preferred, and a polyamide resin is even more preferred.

In the present invention, the continuous thermoplastic resin fiber is preferably exemplified by an embodiment in which 80 mass % or more (preferably 90 mass % or more, more preferably 95 mass % or more, and even more preferably 98 mass % or more) is a polyamide resin.

When the thermoplastic resin constituting the thermoplastic resin fiber has a melting point, the melting point is preferably 170° C. or higher, more preferably 190° C. or higher, and even more preferably 210° C. or higher. With the melting point of the thermoplastic resin not lower than the lower limit described above, the molded article tends to have even better thermal resistance. In addition, the upper limit value of the melting point is preferably 290° C. or lower, more preferably 265° C. or lower, and even more preferably 240° C. or lower. With the melting point of the thermoplastic resin not higher than the upper limit described above, molding processability tends to be even better.

In addition, the glass transition temperature of the thermoplastic resin constituting the continuous thermoplastic resin fiber is preferably 30° C. or higher, more preferably 40° C. or higher, and particularly preferably 55° C. or higher. The thermoplastic resin with a glass transition temperature not lower than the lower limit described above is readily compatible with the prepreg before curing in the heating, and this tends to improve the adhesion of the resulting molded article. Furthermore, the upper limit value of the glass transition temperature is preferably 180° C. or lower, more preferably 150° C. or lower, and even more preferably 100° C. or lower. With the glass transition temperature of the thermoplastic resin not higher than the upper limit described above, adhesion with the prepreg tends to be even better.

In addition, the continuous thermoplastic resin fiber used in the present invention may contain a component of various types within a range that does not impair the objects and effects of the present invention. For example, an additive, such as an elastomer, an antioxidant, a stabilizer such as a thermal stabilizer, a hydrolysis-resistance improving agent, a weather resistant stabilizer, a matting agent, an ultraviolet absorber, a nucleating agent, a plasticizer, a dispersant, a flame retardant, an antistatic agent, an anticolorant, an anti-gelling agent, a colorant, a release agent, or a lubricant can be added. Details of these can be referred to descriptions in paragraphs [0130] to [0155] of JP 4894982 B, the contents of which are incorporated in the present specification.

Polyamide Resin

For the polyamide resin used in the present invention, a known polyamide resin can be widely used.

In the present invention, the melting point of the polyamide resin is preferably 150° C. or higher, more preferably 180° C. or higher, and even more preferably 190° C. or higher. In addition, the upper limit value of the melting point is preferably 310° C. or lower, more preferably 300° C. or lower, and even more preferably 250° C. or lower.

Furthermore, the lower limit value of the glass transition temperature of the polyamide resin is preferably 50° C. or higher, more preferably 55° C. or higher, and particularly preferably 60° C. or higher. With the glass transition temperature in this range, thermal resistance tends to be good. Moreover, the upper limit value of the glass transition temperature is preferably 100° C. or lower.

In addition, the lower limit value of the terminal amino group concentration ([NH$_2$]) of the polyamide resin is preferably 10 μeq/g or higher and more preferably 15 μeq/g or higher. The polyamide resin with a terminal amino group concentration not lower than the lower limit described above tends to further improve the reactivity with the thermosetting resin contained in the prepreg. Furthermore, the upper limit value is preferably 100 μeq/g or lower and more preferably 50 μeq/g or lower. With the terminal amino group concentration of the polyamide resin not higher than the lower limit described above, adhesion with the prepreg tends to be even better.

The terminal amino group concentration of the polyamide resin can be referred to descriptions in paragraph [0108] of WO 2012/169334, the contents of which are incorporated in the present specification.

The polyamide resin used in the present invention has a number average molecular weight (Mn) preferably from 6000 to 30000, more preferably from 8000 to 28000, even more preferably from 9000 to 26000, still more preferably from 10000 to 24000, and still more preferably from 11000 to 22000. The polyamide with a number average molecular weight in such a range provides better thermal resistance, elastic modulus, dimensional stability, and molding processability.

The number average molecular weight (Mn) referred to herein can be referred to descriptions in paragraphs [0108] to [0110] of WO 2012/169334, the contents of which are incorporated in the present specification.

Examples of the polyamide resin used in the present invention include polyamide 4, polyamide 6, polyamide 11, polyamide 12, polyamide 46, polyamide 66, polyamide 610, polyamide 612, poly(hexamethylene terephthalamide) (polyamide 6T), poly(hexamethylene isophthalamide) (polyamide 6I), polyamide 66/6T, polyxylylene adipamide, polyxylylene sebacamide, polyxylylene dodecamide, polyamide 9T, polyamide 9MT, and polyamide 6I/6T.

Of the polyamide resins described above, from the viewpoints of moldability and thermal resistance, the polyamide resin preferably contains a structural unit derived from a diamine and a structural unit derived from a dicarboxylic acid; and 50 mol % or more of the structural unit derived from a diamine is derived from xylylenediamine, and 50 mol % or more of the structural unit derived from a dicarboxylic acid is derived from an α,ω-linear aliphatic dicarboxylic acid having from 4 to 20 carbons (which may be hereinafter referred to as the "XD-based polyamide").

In addition, when the polyamide resin is a mixture, the proportion of the XD-based polyamide in the polyamide resin is preferably 50 mass % or more, more preferably 80 mass % or more, and may be 90 mass % or more.

In the XD-based polyamide, preferably 70 mol % or more, more preferably 80 mol % or more, even more preferably 90 mol % or more, and still more preferably 95 mol % or more of the structural unit derived from a diamine is derived from meta-xylylenediamine and/or para-xylylenediamine, and preferably 70 mol % or more, more preferably 80 mol % or more, even more preferably 90 mol % or more, still more preferably 95 mol % or more of the structural unit derived from a dicarboxylic acid is derived from an α,ω-linear aliphatic dicarboxylic acid having from 4 to 20 carbons.

A diamine that can be used as the raw material diamine component of the XD-based polyamide other than meta-xylylenediamine and para-xylylenediamine can be exemplified by aliphatic diamines, such as tetramethylenediamine, pentamethylenediamine, 2-methylpentanediamine, hexamethylenediamine, heptamethylenediamine, octamethylenediamine, nonamethylenediamine, decamethylenediamine, dodecamethylenediamine, 2,2,4-trimethylhexamethylenediamine, and 2,4,4-trimethylhexamethylenediamine; alicyclic diamines, such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin, and bis(aminomethyl)tricyclodecane; and diamines having an aromatic ring, such as bis(4-aminophenyl) ether, para-phenylenediamine, and bis(aminomethyl)naphthalene. One of these can be used, or two or more can be mixed and used.

When a diamine other than xylylenediamine is used as the diamine component, the proportion of the diamine is less than 50 mol %, preferably 30 mol % or less, more preferably from 1 to 25 mol %, and particularly preferably from 5 to 20 mol % of the diamine-derived structural unit.

The α,ω-linear aliphatic dicarboxylic acid having from 4 to 20 carbons preferably used as the raw material dicarboxylic acid component of the polyamide resin can be exemplified by aliphatic dicarboxylic acids, such as succinic acid, glutaric acid, pimelic acid, suberic acid, azelaic acid, adipic acid, sebacic acid, undecanedioic acid, and dodecanedioic acid. One of these can be used, or two or more can be mixed and used, but of these, adipic acid or sebacic acid provides a polyamide resin with a melting point in an appropriate range for mold processing and thus is preferably used.

A dicarboxylic acid component other than the α,ω-linear aliphatic dicarboxylic acid having from 4 to 20 carbons can be exemplified by phthalic acid compounds, such as isophthalic acid, terephthalic acid, and ortho-phthalic acid; naphthalenedicarboxylic acid isomers, such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, 2,6-naphthalenedicarboxylic acid, and 2,7-naphthalenedicarboxylic acid. One of these can be used, or two or more can be mixed and used.

When a dicarboxylic acid other than the $\alpha,\omega$-linear aliphatic dicarboxylic acid having from 4 to 20 carbons is used as the dicarboxylic acid component, terephthalic acid or isophthalic acid is preferably used from the viewpoints of molding processability and barrier properties. The proportion of terephthalic acid or isophthalic acid is preferably 30 mol % or less, more preferably from 1 to 30 mol %, and particularly preferably from 5 to 20 mol % of the structural unit derived from a dicarboxylic acid.

Here, "containing a structural unit derived from a diamine and a structural unit derived from a dicarboxylic acid" means that the amide bond constituting the XD-based polyamide is formed by a bond between a dicarboxylic acid and a diamine. In addition, the XD-based polyamide contains any other moiety, such as a terminal group, in addition to the dicarboxylic acid-derived structural unit and the diamine-derived structural unit. Furthermore, the XD-based polyamide may contain a repeating unit having an amide bond not derived from the bond between a dicarboxylic acid and a diamine, a trace amount of an impurity, or the like. Specifically, for the XD-based polyamide, in addition to the diamine component and the dicarboxylic acid component, a lactam, such as ε-caprolactam or laurolactam; or an aliphatic aminocarboxylic acid, such as aminocaproic acid or aminoundecanoic acid; can also be used as a copolymer component constituting the polyamide resin within a range that does not impair the effects of the present invention. In the present invention, preferably 90 mass % or more, more preferably 95 mass % or more, even more preferably 98 mass % or more of the XD-based polyamide is the structural unit derived from a diamine or the structural unit derived from a dicarboxylic acid.

Continuous Reinforcing Fiber

The commingled yarn used in the present invention contains a continuous reinforcing fiber.

The continuous reinforcing fiber in the commingled yarn means that the reinforcing fibers are continuously present from one end to another end in the longitudinal direction of the commingled yarn. Those in which reinforcing fibers are spun into continuous reinforcing fibers are considered as those in which the reinforcing fibers are continuously present.

Thus, the length of the continuous reinforcing fiber is determined according to the shape of a molded article, and for example, a number average fiber length is 3 cm or more, or typically 10 cm or more. The upper limit value may be, for example, 100 m or less.

The continuous reinforcing fiber is not limited, and any continuous reinforcing fiber that is applicable to this type of technologies can be appropriately selected and used. The continuous reinforcing fiber is exemplified by a plant fiber, a carbon fiber, a glass fiber, an alumina fiber, a boron fiber, a ceramic fiber, and an aramid fiber, and is preferably at least one of: a carbon fiber or a glass fiber.

For the carbon fiber, a wide variety of known carbon fibers can be widely adopted, and for example, a polyacrylonitrile-based carbon fiber or a pitch-based carbon fiber can be preferably used. In addition, a carbon fiber made from a plant-derived raw material, such as lignin or cellulose, can also be used.

For the glass fiber, a fiber obtained by melt spinning glass, such as E glass, C glass, A glass, S glass, and alkali-resistant glass, which are ordinarily supplied, is used, but in the present invention, E glass is preferably contained.

The cross section of the continuous reinforcing fiber may be either circular or non-circular.

When the continuous reinforcing fiber is a carbon fiber, the tensile strength is preferably 1500 MPa or more, more preferably 2500 MPa or more, and even more preferably 3500 MPa or more. The upper limit value is not specifically limited but is practically 8000 MPa or less. For the glass fiber, the tensile strength is preferably 800 MPa or more, more preferably 1800 MPa or more, and even more preferably 2800 MPa or more. The upper limit value is not specifically limited but is practically 5000 MPa or less.

Prepreg and Commingled Yarn

In the present invention, the difference between the glass transition temperature of the thermoplastic resin constituting the continuous thermoplastic resin fiber and the glass transition temperature of the thermosetting resin (preferably the glass transition temperature of the thermosetting resin—the glass transition temperature of the thermoplastic resin constituting the continuous thermoplastic resin fiber) is preferably 15° C. or higher, more preferably 18° C. or higher, and even more preferably 20° C. or higher. With the difference in the glass transition temperature not less than the lower limit described above, molding processability tends to be even better. In addition, the upper limit value of the difference in the glass transition temperature is preferably 200° C. or lower, more preferably 100° C. or lower, even more preferably 70° C. or lower, and still more preferably 65° C. or lower. With the difference in the glass transition temperature not more than the upper limit described above, the prepreg and the commingled yarn tend to be molded with higher adhesion.

In addition, in the present invention, the difference between the melting point of the thermoplastic resin (only when the thermoplastic resin has a melting point) constituting the continuous thermoplastic resin fiber and the glass transition temperature of the thermosetting resin (preferably the melting point of the thermoplastic resin constituting the continuous thermoplastic resin fiber—the glass transition temperature of the thermosetting resin) is preferably 90° C. or higher, more preferably 100° C. or higher, and even more preferably 105° C. or higher. With the difference between the melting point and the glass transition temperature not less than the lower limit described above, instantaneous thermal resistance tends to be even better. In addition, the upper limit value of the difference of the melting point is, for example, 300° C. or lower, preferably 150° C. or lower, more preferably 145° C. or lower, and even more preferably 140° C. or lower. With the difference between the melting point and the glass transition temperature not more than the upper limit described above, the prepreg and the commingled yarn tend to be molded with higher adhesion.

In the present invention, the surface area of the commingled yarn (the portion 2 in FIG. 1) to the surface area of the prepreg (the portion 1 in FIG. 1) is preferably from 0.1 to 10%. In addition, the ratio of the mass of the prepreg to the mass of the commingled yarn is preferably 100:from 0.1 to 10. The commingled yarn is thus provided only in a part of the prepreg, and this provides a molded article having excellent mechanical strength while maintaining high moldability.

Heating

The present invention includes disposing the commingled yarn on a part of the surface of the prepreg and heat-processing the commingled yarn and the prepreg.

The heating temperature is typically determined based on the curing temperature of the thermosetting resin. The heating temperature is preferably 100° C. or higher, more preferably 105° C. or higher, and even more preferably 110° C. or higher. With the heating temperature not lower than the lower limit described above, the thermosetting resin is sufficiently cured. In addition, when specified in relation to the glass transition temperature of the thermosetting resin contained in the prepreg, the heating temperature is preferably not lower than the Tg of the thermosetting resin and more preferably not lower than the Tg of the thermosetting resin+5° C. Furthermore, the upper limit value of the heating temperature is preferably 220° C. or lower, more preferably 210° C. or lower, and even more preferably 200° C. or lower. Moreover, when specified in relation to the glass transition temperature of the thermosetting resin contained in the prepreg, the upper limit of the heating temperature is preferably not higher than the Tg of the thermosetting resin+30° C. and more preferably not higher than the Tg of the thermosetting resin+20° C. With the heating temperature not higher than the upper limit described above, deterioration of the thermosetting resin due to rapid heat generation can be effectively prevented.

Further, in relation to the melting point of the thermoplastic resin constituting the continuous thermoplastic resin fiber, the melting point of the thermoplastic resin constituting the continuous thermoplastic resin fiber is preferably higher than the curing temperature of the thermosetting resin, preferably higher by 40° C. or more, more preferably higher by 100° C. or more, even more preferably higher by 110° C. or more, and still more preferably higher by 118° C. or more. With the melting point of the thermoplastic resin not lower than the lower limit described above, the dimensional stability of the resulting molded article tends to further improve. In addition, the upper limit of the difference between the melting point of the continuous thermoplastic resin and the curing temperature is preferably 150° C. or lower, more preferably 140° C. or lower, and even more preferably 130° C. or lower. With the difference between the melting point and the curing temperature not more than the upper limit described above, adhesion between the prepreg and the commingled yarn tends to be even better.

In addition, in relation to the glass transition temperature of the thermoplastic resin constituting the continuous thermoplastic resin fiber, the glass transition temperature of the thermoplastic resin constituting the continuous thermoplastic resin fiber is preferably lower than the curing temperature of the thermosetting resin, preferably lower by 10° C. or more, more preferably lower by 20° C. or more, even more preferably lower by 25° C. or more. With the glass transition temperature of the thermoplastic resin not lower than the lower limit described above, adhesion between the prepreg and the commingled yarn tends to further improve. Furthermore, the upper limit of the difference between the curing temperature and the glass transition temperature of the continuous thermoplastic resin is preferably 120° C. or lower, more preferably 75° C. or lower, and even more preferably 40° C. or lower. With the difference between the curing temperature and the glass transition temperature not higher than the upper limit described above, mechanical properties of the thermoplastic resin can be less likely to be impaired.

The melting point and glass transition temperature, as well as the curing temperature of the thermosetting resin are measured according to descriptions in Examples below.

In the heat processing, the heating method includes, for example, placing a prepreg on which a commingled yarn is disposed in a metal mold with the prepreg underneath, sealing the prepreg with a bagging film, depressurizing the inside with a vacuum pump, heating and pressurizing, cooling to room temperature, depressurizing, taking out the prepreg from a kettle, and peeling the bagging film. The pressure of the heating pressure kettle can be from 2 to 4 atm.

In the present invention, after the commingled yarn is disposed, the commingled yarn may be further fixed on the surface of the prepreg using a thread-like material, and then the heat processing may be carried out.

The thread-like material is preferably a thermoplastic resin fiber. For the thermoplastic resin constituting the thermoplastic resin fiber, a thermoplastic resin, such as the following, can be used: a polyolefin resin, such as a polyethylene or a polypropylene; a polyamide resin; a polyester resin, such as a poly(ethylene terephthalate) or a poly(butylene terephthalate); a polycarbonate resin; a poly(oxymethylene) resin; a poly(ether ketone) resin, such as a poly(ether ketone), a poly(ether ether ketone), a poly(ether ketone ketone), or a poly(ether ether ketone ketone); a poly(ether sulfone) resin; a poly(ether sulfide) resin; a thermoplastic polyimide resin, such as a thermoplastic poly(ether imide), a thermoplastic poly(amide imide), a wholly aromatic polyimide, or a semi-aromatic polyimide. In the present invention, the thermoplastic resin is preferably a polyamide resin. As a specific example of the polyamide resin, the polyamide resin described for the continuous thermoplastic resin fiber contained in the commingled yarn described above can be preferably employed. In the present invention, the melting point of the thermoplastic resin constituting the thermoplastic resin fiber used as the thread-like material is preferably higher than the melting point of the thermoplastic resin constituting the continuous thermoplastic resin fiber contained in the commingled yarn by 15° C. or more, can be higher by 16° C. or more, even can be higher by 17° C. or more, and particularly can be higher by 18° C. or more. Such a constitution enables the thermoplastic resin fiber to be impregnated with the configuration of the continuous reinforcing fiber in the commingled yarn remaining undisturbed, and this improves the appearance of the resulting molded article. In addition, the upper limit is not specifically limited but is preferably 100° C. or lower, more preferably 80° C. or lower, and particularly preferably 75° C. or lower.

Furthermore, the thread-like material and the fixing method using it can be referred to descriptions of WO 2016/159340 as long as they do not depart from the spirit of the present invention, and the contents of which are incorporated in the present specification.

Disposition

In the method for manufacturing a molded article of the present invention, the commingled yarn is disposed on a part of the surface of the prepreg. The part where the commingled yarn is disposed is mainly a part where the strength of the molded article is desired to be increased, and the commingled yarn is preferably disposed in a bent state, for example, as illustrated by reference numeral 1 in FIG. 1.

Specifically, the manufacturing method of the present invention is suitable for an embodiment in which at least a part of the commingled yarn is disposed on the surface of the prepreg to give a radius of curvature of 100 cm or less. The lower limit of the radius of curvature is appropriately determined according to the application but is suitable for 3 cm or more. The radius of curvature here refers to a radius of curvature of the smallest part in the commingled yarn.

Applications

In the present invention, the molded article is widely used in applications including components for transportation devices, such as automobiles and aircrafts; general mechanical components; precision mechanical components; electronic and electrical equipment components; OA equipment components; building materials and housing-related components; medical devices; leisure sporting goods; amusement goods; medical products; daily necessities, such as food packaging films; and defense and aerospace products. In particular, the molded article is preferably used in seat sheets of means of transport, such as vehicles and airplanes.

Composite Material

The composite material of the present invention is a composite material including a commingled yarn containing a continuous reinforcing fiber and a continuous thermoplastic resin fiber, the commingled yarn being disposed on a part of a surface of a prepreg, the prepreg containing continuous reinforcing fibers paralleling at least unidirectionally and a thermosetting resin impregnated between the continuous reinforcing fibers. In particular, the commingled yarn is fixed on the surface of the prepreg by using a thread-like material. In addition, details of the composite material are synonymous with those described for the method for manufacturing the molded article described above, and the preferred ranges are also the same.

EXAMPLES

The present invention will be described more specifically with reference to examples below. Materials, amounts used, proportions, processing details, processing procedures, and the like described in the following examples can be appropriately changed as long as they do not depart from the spirit of the present invention. Thus, the scope of the present invention is not limited to the specific examples described below.

Raw Materials

Prepreg (epoxy resin/carbon fiber/bidirectional): a prepreg in which an epoxy resin is impregnated between a woven fabric of a continuous carbon fiber, Torayca T300/#2500, available from Toray Industries, Inc.; proportion of the reinforcing fiber, 76 mass % (70 vol. %)

Prepreg (epoxy resin/carbon fiber/unidirectional): a unidirectional prepreg in which an epoxy resin is impregnated between a continuous carbon fiber, Torayca T700SC/#2500, available from Toray Industries, Inc.; proportion of the reinforcing fiber, 76 mass % (70 vol. %)

Prepreg (epoxy resin/glass fiber/bidirectional): manufactured according to the following manufacturing example.

Prepreg (cyanate resin/carbon fiber/bidirectional): manufactured according to the following manufacturing example.

Manufacture of Woven Prepreg in which Epoxy Resin is Impregnated Between Glass Fiber An epoxy resin (#2500, available from Toray Industries, Inc.) was immersed in a glass fiber woven fabric (KS1210 1080S-935N, available from Nitto Boseki Co., Ltd.; Metsuke (areal fiber weight), 90 g/m$^2$), then squeezed with a nip roll, and a prepreg (glass fiber, bidirectional) was obtained. The proportion of the reinforcing fiber in the prepreg was 81 mass % (70 vol. %).

Manufacture of Woven Prepreg in which Cyanate Resin is Impregnated Between Carbon Fiber Relative to 100 parts by mass of a cyanate ester resin (diallylbisphenol A dicyanate, available from Mitsubishi Gas Chemical Company, Inc.), 1.0 parts by mass of a curing accelerator (tetraphenylphosphonium tetra-p-tolylborate, TPP-TTB, TPP-MK, available from Hokko Chemical Industry Co., Ltd.) was melted over 90° C./1 hour.

The resulting resin was held at 90° C. in a vessel to turn into a molten state, and a carbon fiber woven fabric (CO6343, available from Toray Industries, Inc.) was passed through the molten resin to impregnate a predetermined amount of the resin into the carbon fiber woven fabric. This was returned to room temperature, and a prepreg was manufactured.

The proportion of the reinforcing fiber in the prepreg was 77 mass % (70 vol. %).

Continuous Reinforcing Fiber

Continuous carbon fiber: Pyrofil-TR-50S-12000-AD, available from Mitsubishi Chemical Corporation; 8000 dtex; fiber count, 12000 f; surface-treated with an epoxy resin.

Continuous glass fiber: ECG 75 1/0 0.7Z, available from Nitto Boseki Co., Ltd.; fineness, 687 dtex; fiber count, 400 f; surface-treated with a sizing agent.

Thermoplastic Resin

MXD6: meta-xylylene adipamide resin (grade S 6001, available from Mitsubishi Gas Chemical Company, Inc.); number average molecular weight, 16800; terminal amino group concentration, 18 µeq/g MP10: poly(meta-,para-xylylene sebacamide), synthesized according to the following synthesis example.

PA6: polyamide resin 6, 1022B, available from Ube Industries, Ltd.; terminal amino group concentration, 40 µeq/g PC: Iupilon 3000 (available from Mitsubishi Engineering-Plastics Corporation); glass transition temperature, 153° C.

Synthesis of MP10

Sebacic acid was heated and dissolved in a reactor under an atmosphere of nitrogen, and then while a mixture of diamines of meta-xylylenediamine (available from Mitsubishi Gas Chemical Company, Inc.) and para-xylylenediamine (available from Mitsubishi Gas Chemical Company, Inc.) in a molar ratio of 7:3 of was gradually added dropwise with stirring the contents under increased pressure (0.35 MPa) to give a molar ratio of the diamines and sebacic acid of about 1:1, the temperature was increased to 235° C. After completion of the dropwise addition, the reaction was continued for 60 minutes, and the amount of components with a molecular weight of 1000 or less was adjusted. After completion of the reaction, the contents were taken out in the form of strands and pelletized with a pelletizer, and a polyamide resin (MP10, M/P=7:3) was obtained. The melting point was 215° C.

The resulting resin had a terminal amino group concentration of 31 µeq/g.

Fixing Thread (Thread-Like Material): Continuous Thermoplastic Resin Fiber, the Thermoplastic Resin is Meta-Xylylene Adipamide Resin, Grade S6011, Available from Mitsubishi Gas Chemical Company, Inc.; Melting Point, 237° C.; Glass Transition Temperature, 88° C.

Thermoplastic resin film: the thermoplastic resin is meta-xylylene adipamide, S6011, available from Mitsubishi Gas Chemical Company, Inc.; a 50-µm thick film produced by melt extrusion was used.

Manufacture of UD Tape

Fibers of a continuous reinforcing fiber in roving form were arranged at equal intervals, passed through a spreader, and spread to a width of 200 mm. When the spread continuous reinforcing fiber was inserted between two upper and lower impregnating rolls, a resin melted in a twin-screw extruder (TEM26SX, available from Toshiba Machine Co., Ltd.) was supplied, and the resin was impregnated between the continuous reinforcing fiber in the impregnating rolls. Subsequently, while being cooled by a cooling roller, the continuous reinforcing fiber was continuously drawn for a length of 50 m and wound onto a cylindrical core material, and a UD tape was obtained. The UD tape was slit to a width of 10 mm and used.

Manufacture of Core-Sheath Structural Fiber

Thermoplastic resin powders shown in Tables were each adhered to the surface of the continuous reinforcing fiber and treated at a temperature of the melting point+20° C. under an atmosphere of nitrogen for 20 minutes, and a fiber having a core/sheath structure in which the core component was a carbon fiber and the sheath component was the thermoplastic resin and carbon fiber accounted for 60 mass % was obtained.

Measurements of Melting Point and Glass Transition Temperature, and Curing Temperature In the present example, the melting point was determined from a peak top temperature of an endothermic peak observed by differential scanning calorimetry during melting of a 1 mg sample by heating from room temperature to 300° C. at a heating rate of 10° C./min under a stream of nitrogen gas flowing at 30 mL/min.

In the present example, for the glass transition temperature of the thermoplastic resin, it was measured by differential scanning calorimetry during heating of a 1 mg sample to 300° C. at a heating rate of 10° C./min, and followed by immediate cooling to room temperature or lower, heating again from room temperature to 300° C. at a heating rate of 10° C./min under a stream of nitrogen gas flowing at 30 mL/min.

In the present example, for the glass transition temperature of the thermosetting resin, it was measured by differential scanning calorimetry during heating of a 1 mg sample from room temperature to 90° C. at a heating rate of 2° C./min, maintaining at 90° C. for 60 minutes, another heating of the sample to 300° C. at a heating rate of 2° C./min, and followed by immediate cooling to room temperature or lower, heating of the sample again from room temperature to 300° C. at a heating rate of 10° C./min under a stream of nitrogen gas flowing at 30 mL/min.

In the present example, the curing temperature of the thermosetting resin was determined from a peak top temperature of an exothermic peak observed by differential scanning calorimetry during heating of a 1 mg sample from room temperature to 300° C. at a heating rate of 2° C./min under a stream of nitrogen gas flowing at 30 mL/min.

For the measurement, a DSC-60 available from SHIMADZU CORPORATION was used.

Example 1

Manufacture of Commingled Yarn
Manufacture of Continuous Thermoplastic Resin Fiber Each of the thermoplastic resins shown in Table 1 was melt-extruded using a single-screw extruder having a 30-mm diameter screw, extruded into a strand form from a 60-hole die, and stretched while being wound with a roll, and 800 m of a fiber bundle of a continuous thermoplastic resin fiber was wound into a wound body. The melting temperature was set at the melting point of the continuous thermoplastic resin+15° C.

Surface Treatment of Thermoplastic Resin Fiber

A deep vat was filled with an oil agent (polyoxyethylene hydrogenated castor oil (EMANON 1112, available from Kao Corporation)), a roller having a rubber-treated surface was installed to bring a lower portion of the roller into contact with the oil agent, and thus the oil agent was constantly adhered to the roller surface by rotating the roller. The oil agent was applied to the surface of the continuous thermoplastic resin fiber by bringing the continuous thermoplastic resin fiber into contact with this roller.

Fiber Mixing

The commingled yarn was manufactured according to the following method.

Each fiber was drawn from the wound body of the continuous thermoplastic resin fiber and from the wound body of the continuous carbon fiber and was opened by air blowing while the fiber was being passed through a plurality of guides. While being opened, the continuous thermoplastic resin fiber and the continuous carbon fiber were bundled into one, and the bundle was further subjected to air blowing while being passed through a plurality of guides to increase the uniformity of the bundle.

The resulting commingled yarn had a fineness of about 13000 dtex, a fiber count of about 13500 f, a volume ratio of the continuous thermoplastic resin fiber to the continuous carbon fiber of 1:1, and a proportion of the continuous carbon fiber of about 61 mass %. In addition, the degree of dispersion and the impregnating ratio of the resulting commingled yarn were measured as follows.

Method of Measuring Degree of Dispersion

Figure 2:
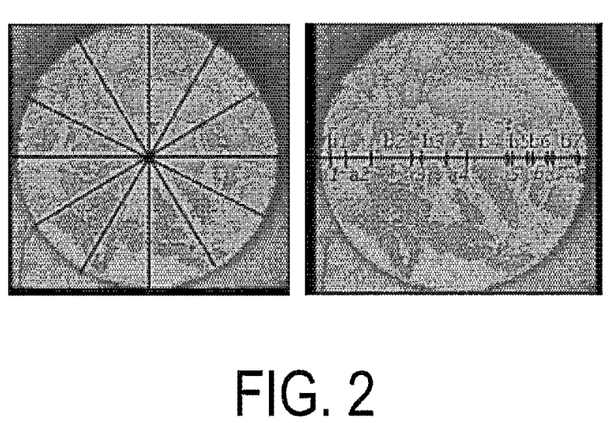
FIG. 2 is an image of a cross-sectional view observed under a microscope.

The commingled yarn was embedded in an epoxy resin, a cross-section perpendicular to the longitudinal direction of the commingled yarn was ground, and the cross-sectional view was photographed using an ultra-deep color 3D shape measuring microscope. As illustrated in FIG. 2, in the photographed image, six auxiliary lines were drawn radially at equal intervals, and lengths of the continuous reinforcing fiber regions on each auxiliary line were measured as a1, a2, a3, . . . ai (i=n). In addition, lengths of the continuous thermoplastic resin fiber regions on each auxiliary line were measured as b1, b2, b3, . . . bi (i=m). Based on the results, the degree of dispersion was calculated by the following equation.

$$\left[1 - \left(\frac{1}{n \text{ or } m} \times \frac{\sum_{i=1}^{n \text{ or } m}(a_i \text{ or } b_i)}{\sum_{i=1}^{n \text{ or } m}(a_i) + \sum_{i=1}^{n \text{ or } m}(b_i)}\right)\right] \times 100 \ (\%) \quad \text{[Equation 1]}$$

For the ultra-deep color 3D shape measuring microscope, a VK-9500 (controller section)/VK-9510 (measurement section) (available from Keyence Corporation) was used.

Method of Measuring Ratio of Impregnation

The commingled yarn or a prepreg was cut out and embedded in an epoxy resin, a surface corresponding to a cross-section of the commingled yarn or the prepreg was ground, and the cross-sectional view was photographed using an ultra-deep color 3D shape measuring microscope. The cross-section of the sample embedded in an epoxy resin was observed with a digital microscope. In the resulting cross-sectional photograph, regions in which the resin of the continuous carbon fiber impregnated were selected using the image analysis software ImageJ, and the surface area was measured. The ratio of impregnation was expressed as the (region where the resin impregnated between the continuous reinforcing fiber)/(cross-sectional area) (unit in %).

For the ultra-deep color 3D shape measuring microscope, a VK-9500 (controller section)/VK-9510 (measurement section) (available from Keyence Corporation) was used.

Manufacture of Molded Article

Figure 1:
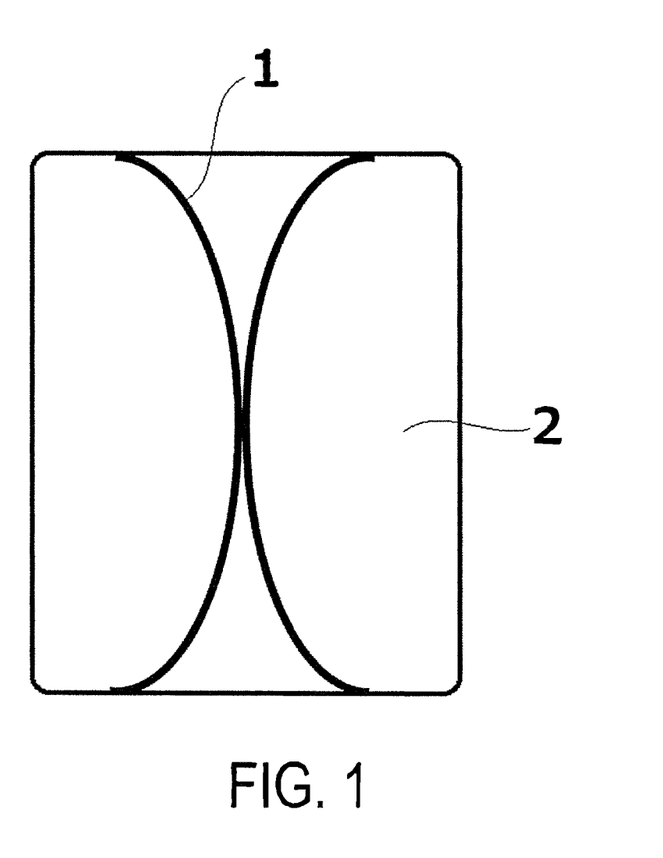
FIG. 1 is a schematic view illustrating a composite material in which a commingled yarn is disposed on a surface of a prepreg.

Prepregs shown in Table 1 were each layered to give a thickness after curing of the value (1 mm) shown in Table 1, and the commingled yarns were each disposed on the surface to give a radius of curvature shown in Table 1. The area of the part of the surface of the prepreg on which the commingled yarn was disposed was 5.6% of the surface (area on one side) of the prepreg (5.5 mass % of the prepreg in terms of mass). FIG. 1 is a schematic view illustrating a state in which the commingled yarn 1 is disposed on the prepreg 2. Furthermore, the commingled yarn was fixed on the prepreg by stitching using the fixing thread, and a composite material was obtained.

The prepreg on which the commingled yarn was disposed was placed in a metal mold with the prepreg underneath and sealed with a bagging film, and the inside was depressurized with a vacuum pump. This was placed in a heating pressure kettle and pressurized to 3 atm, heated to 90° C. at 2° C./min, maintained for 1 hour, then heated to a curing temperature of the thermosetting resin+10° C. at 2° C./min, maintained for 3 hours, then heated to a melting point of the thermoplastic resin+10° C. at 2° C./minute, and maintained for 1 minute. Then, the heating pressure kettle was cooled to room temperature and depressurized, and the prepreg was taken out from the kettle. The bagging film was peeled, and a molded article was obtained.

The resulting molded article was evaluated for rigidity and lightness as follows.

Rigidity

The molded article was compressed using an autograph (AG-Xplus 100 kN, available from SHIMADZU CORPORATION) under conditions of a distance between fulcrums of 160 mm, a moving speed of 1 mm/min, and 23° C., and was evaluated from the bending displacement at a load of 200 N according to the following criteria.

A: less than 10 mm
B: 10 mm or more and 15 mm less
C: 15 mm or more

Lightness

The mass and area of the molded article were measured, and the value obtained by dividing the mass by the area was evaluated according to the following criteria.

A: less than 0.2 g/cm$^2$
B: 0.2 g/cm$^2$ or more and less than 0.4 g/cm$^2$
C: 0.4 g/cm$^2$ or more Example 2

In Example 1, the type of the thermoplastic resin used in the commingled yarn and the like were changed as shown in Table 1, and everything else was carried out in the same manner. As in Example 1, a molded article with high rigidity, light weight, and a stable shape was obtained.

Example 3

In Example 1, the type of the thermoplastic resin used in the commingled yarn and the like were changed as shown in Table 1, and everything else was carried out in the same manner. As in Example 1, a molded article with high rigidity and light weight was obtained. However, the resulting molded article was somewhat prone to warping under a high humidity environment.

Example 4

In Example 1, except for changing the type of the thermoplastic resin used in the commingled yarn and the like as shown in Table 1 and further changing the temperature in the heating processing to the glass transition temperature+100° C., everything else was carried out in the same manner. As in Example 1, a molded article with high rigidity, light weight, and a stable shape was obtained.

Example 5

In Example 1, the prepreg was changed to the woven prepreg and the like in which the epoxy resin was impregnated between the glass fiber, and everything else was carried out in the same manner.

A molded article with high rigidity was obtained. The lightness was at a practical level but was inferior to those of the molded articles manufactured using a carbon fiber.

Example 6

In Example 1, the type of the continuous reinforcing fiber used in the commingled yarn and the like were changed as shown in Table 1, and everything else was carried out in the same manner.

The resulting commingled yarn had a fineness of about 15000 dtex, a fiber count of about 10000 f, a volume ratio of the continuous thermoplastic resin fiber to the continuous glass fiber of 1:1, and a proportion of the continuous glass fiber of about 69 mass %.

When the glass fiber was used in the commingled yarn, a light molded article was obtained. The rigidity was at a practical level but was inferior to those of the molded articles manufactured using a carbon fiber.

Example 7

In Example 5, the type of the continuous reinforcing fiber used in the commingled yarn and the like were changed as shown in Table 1, and everything else was carried out in the same manner.

The lightness of the resulting molded article was at a practical level but was inferior to those of the molded articles manufactured using a carbon fiber. In addition, the rigidity was at a practical level but was inferior to those of the molded articles manufactured using a carbon fiber. Furthermore, the resulting molded article was easily distorted although this was at a practical level.

Example 8

In Example 1, except for changing the prepreg to the prepreg (carbon fiber/unidirectional) and changing the radius of curvature to the value shown in Table 1, everything else was carried out in the same manner.

The rigidity of the resulting molded article was at a practical level but was inferior to those of the molded articles manufactured using a carbon fiber. Furthermore, a trace of fixing the commingled yarn with the fixing thread was somewhat conspicuous although this was at a practical level.

Example 9

In Example 1, except for not using the fixing thread and changing the radius of curvature to the value shown in Table 1, everything else was carried out in the same manner.

The rigidity was at a practical level, but the commingled yarn shifted during molding compared to those not fixed, and the rigidity was somewhat inferior to that of Example 1. Furthermore, morphological stability was at a practical level but was inferior.

Example 10

In Example 1, the prepreg was changed to the woven prepreg (carbon fiber, bidirectional) in which the cyanate resin obtained above was impregnated between the carbon fiber, and the heating was maintained at 150° C. for 3 hours, then maintained at 180° C. for 5 hours, and then maintained at 250° C. for 5 hours. Changed were made as shown in Table 1, and everything else was carried out in the same manner.

The rigidity was at a practical level but was inferior to those of Example 1 and other examples. In addition, the difference between the glass transition temperature of the thermoplastic resin constituting the continuous thermoplastic resin fiber and a glass transition temperature of the thermosetting resin was 105° C., the curing temperature was high, and the curing time was long. These may have deteriorated the thermoplastic resin fiber during molding, and thus the example was inferior also in terms of moldability.

Comparative Example 1

Except for layering the prepregs to give a thickness after curing of 3 mm and not disposing the commingled yarn, everything else was carried out in the same manner as in Example 1. The rigidity comparable to those of the molded articles obtained in examples was achieved, but this increased the thickness. In other words, to achieve the rigidity comparable to those of the molded articles obtained in the examples, a thickness of approximately three times was found to be necessary.

Comparative Example 2

The commingled yarn was not disposed, but everything else was carried out in the same manner as in Example 1. When the thickness comparable to that of the molded article obtained in Example 1 was achieved, the rigidity could not be achieved at all.

Comparative Example 3

Except for changing the prepreg to a thermoplastic resin film and carrying out the heating directly to a melting point of the thermoplastic resin+10° C., everything else was carried out in the same manner as in Example 1. In addition to not satisfying sufficient rigidity as a molded article, the resulting molded article had problems in various performances required for seat sheets.

Comparative Example 4

Instead of the commingled yarn, the UD tape obtained above was used, and everything else was carried out in the same manner as in Example 1. The UD tape failed to be disposed on a curved surface.

Comparative Example 5

In Example 1, the commingled yarn was changed to the continuous carbon fiber, the heating was maintained at a curing temperature of the thermosetting resin+10° C. for 3 hours, then the heating pressure kettle was cooled to room temperature and depressurized. Everything else was carried out in the same manner. The thermoplastic resin was insufficient at a location where the continuous carbon fiber was disposed, and a molding defect was observed. Thus, rigidity and lightness were not evaluated.

Comparative Example 6

In Example 1, instead of the commingled yarn, the core-sheath structural fiber obtained above was used, and everything else was carried out in the same manner. The thermoplastic resin was not sufficiently impregnated between the continuous carbon fiber, and rigidity was not expressed.

TABLE 1

| | | Example 1 | Example 2 | Example 3 | Example 4 | Example 5 |
|---|---|---|---|---|---|---|
| Prepreg | Thermosetting resin | Epoxy resin | Epoxy resin | Epoxy resin | Epoxy resin | Epoxy resin |
| | Tg (° C.) of thermosetting resin | 106 | 106 | 106 | 106 | 106 |
| | Curing temperature (° C.) of thermosetting resin | 116 | 116 | 116 | 116 | 116 |
| | Continuous reinforcing fiber | Carbon fiber | Carbon fiber | Carbon fiber | Carbon fiber | Glass fiber |
| | Arrangement of continuous reinforcing fiber | Bidirectional | Bidirectional | Bidirectional | Bidirectional | Bidirectional |
| | Ratio of impregnation (%) | 100% | 100% | 100% | 100 | 100% |
| Commingled yarn | Thermoplastic resin | MXD6 | MP10 | PA6 | PC | MXD6 |
| | Tg (° C.) of thermoplastic resin | 85 | 63 | 50 | 150 | 85 |
| | Tm (° C.) of thermoplastic resin | 237 | 215 | 220 | — | 237 |
| | Continuous reinforcing fiber | Carbon fiber | Carbon fiber | Carbon fiber | Carbon fiber | Carbon fiber |
| | Degree of dispersion (%) | >90% | >90% | >90% | 82% | >90% |
| | Ratio of impregnation (%) | 0 | 5 | 0 | 0 | 0 |
| | Radius of curvature (cm) | 80 | 70 | 60 | 90 | 40 |
| Fixing thread | Continuous thermoplastic resin fiber | Present | Present | Present | Present | Present |

TABLE 1-continued

|  |  | Example 1 | Example 2 | Example 3 | Example 4 | Example 5 |
|---|---|---|---|---|---|---|
| Molded article | Thickness (mm) | 1 | 1 | 1 | 1 | 2 |
|  | Rigidity | A | A | A | A | A |
|  | Lightness | A | A | A | A | B |

TABLE 2

|  |  | Example 6 | Example 7 | Example 8 | Example 9 | Example 10 |
|---|---|---|---|---|---|---|
| Prepreg | Thermosetting resin | Epoxy resin | Epoxy resin | Epoxy resin | Epoxy resin | Cyanate resin |
|  | Tg (° C.) of thermosetting resin | 106 | 106 | 106 | 106 | 190 |
|  | Curing temperature (° C.) of thermosetting resin | 116 | 116 | 116 | 116 | 199 |
|  | Continuous reinforcing fiber | Carbon fiber | Glass fiber | Carbon fiber | Carbon fiber | Carbon fiber |
|  | Arrangement of continuous reinforcing fiber | Bidirectional | Bidirectional | Unidirectional | Bidirectional | Bidirectional |
|  | Ratio of impregnation (%) | 100% | 100% | 100% | 100% | 99% |
| Commingled yarn | Thermoplastic resin | MXD6 | MXD6 | MXD6 | MXD6 | MXD6 |
|  | Tg (° C.) of thermoplastic resin | 85 | 85 | 85 | 85 | 85 |
|  | Tm (° C.) of thermoplastic resin | 237 | 237 | 237 | 237 | 237 |
|  | Continuous reinforcing fiber | Glass fiber | Glass fiber | Carbon fiber | Carbon fiber | Carbon fiber |
|  | Degree of dispersion (%) | >90% | >90% | >90% | >90% | >90% |
|  | Ratio of impregnation (%) | 0 | 0 | 0 | 0 | 0 |
|  | Radius of curvature (cm) | 30 | 20 | 100 | 50 | 80 |
| Fixing thread | Continuous thermoplastic resin fiber | Present | Present | Present | None | Present |
| Molded article | Thickness (mm) | 1 | 2 | 1 | 1 | 1 |
|  | Rigidity | B | B | B | B | B |
|  | Lightness | A | B | A | A | A |

TABLE 3

|  |  | Comparative Example 1 | Comparative Example 2 | Comparative Example 3 | Comparative Example 4 | Comparative Example 5 | Comparative Example 6 |
|---|---|---|---|---|---|---|---|
| Prepreg | Thermosetting resin | Epoxy resin | Epoxy resin | Thermoplastic resin film | Epoxy resin | Epoxy resin | Epoxy resin |
|  | Tg (° C.) of thermosetting resin | 106 | 106 |  | 106 | 106 | 106 |
|  | Curing temperature (° C.) of thermosetting resin | 116 | 116 |  | 116 | 116 | 116 |
|  | Continuous reinforcing fiber | Carbon fiber | Carbon fiber |  | Carbon fiber | Carbon fiber | Carbon fiber |
|  | Arrangement of continuous reinforcing fiber | Bidirectional | Bidirectional |  | Bidirectional | Bidirectional | Bidirectional |
|  | Ratio of impregnation (%) | 100% | 100% | — | 100% | 100% | 100% |
| Commingled yarn | Thermoplastic resin | — | — | MXD6 | MXD6 | — | MXD6 |
|  | Tg (° C.) of thermoplastic resin | — | — | 85 | 85 | — | 85 |
|  | Tm (° C.) of thermoplastic resin | — | — | 237 | 237 | — | 237 |
|  | Continuous reinforcing fiber | — | — | Carbon fiber | Carbon fiber (UD tape) | Carbon fiber | Carbon fiber Core-sheath fiber |
|  | Degree of dispersion (%) | — | — | >90% | >90% | — | >90% |
|  | Ratio of impregnation (%) | — | — | 0 | >90% | — | 10% |
|  | Radius of curvature (cm) | — | — | 80 | — | 80 | — |
| Fixing thread | Continuous thermoplastic resin fiber | None | None | None | Present | Present | Present |
| Molded article | Thickness (mm) | 3 | 1 | — | 1 | 1 | 1 |
|  | Rigidity | A | C | C | — | — | C |
|  | Lightness | C | A | A | — | — | A |

REFERENCE SIGNS LIST

1 Commingled yarn
2 Prepreg

The invention claimed is:

1. A method for manufacturing a molded article, comprising:

disposing a commingled yarn containing a continuous reinforcing fiber and a continuous thermoplastic resin fiber on a part of a surface of a prepreg, the prepreg containing continuous reinforcing fibers paralleling in at least one direction and a thermosetting resin impregnated between the continuous reinforcing fibers;

after disposing the commingled yarn, fixing the commingled yarn on the surface of the prepreg by using a thermoplastic resin fiber, and heat-processing the prepreg with the commingled yarn after fixing the commingled yarn.

2. The method for manufacturing a molded article according to claim 1, wherein a melting point of a thermoplastic resin fiber constituting the continuous thermoplastic resin fiber is higher than a curing temperature of the thermosetting resin, the melting point being a peak top temperature of an endothermic peak observed by differential scanning calorimetry during melting of a 1 mg sample of the thermoplastic resin fiber by heating the sample from room temperature to 300° C. at a heating rate of 10° C/min under a stream of nitrogen gas flowing at 30 mL/min.

3. The method for manufacturing a molded article according to claim 1, wherein a glass transition temperature of a thermoplastic resin fiber constituting the continuous thermoplastic resin fiber is lower than a curing temperature of the thermosetting resin, the glass transition temperature being measured by differential scanning calorimetry during heating of a 1 mg sample of the thermoplastic resin fiber to 300° C. at a heating rate of 10° C/min under a stream of nitrogen gas flowing at 30 mL/min, and followed by immediate cooling of the sample to room temperature or lower, heating again from room temperature to 300° C. at a heating rate of 10° C/min.

4. The method for manufacturing a molded article according to claim 1, wherein the prepreg comprises continuous reinforcing fibers paralleling bidirectionally, and a thermosetting resin impregnated between the continuous reinforcing fibers.

5. The method for manufacturing a molded article according to claim 1, wherein the thermosetting resin is an epoxy resin.

6. The method for manufacturing a molded article according to claim 1, wherein the continuous reinforcing fibers contained in the prepreg comprise at least one of: a carbon fiber or a glass fiber.

7. The method for manufacturing a molded article according to claim 1, wherein the continuous reinforcing fiber contained in the commingled yarn comprises a carbon fiber and/or a glass fiber.

8. The method for manufacturing a molded article according to claim 1, wherein the continuous thermoplastic resin fiber contained in the commingled yarn comprises a polyamide resin.

9. The method for manufacturing a molded article according to claim 1, wherein at least a part of the commingled yarn is disposed on the surface of the prepreg to give a radius of curvature of 100 cm or less.

10. The method for manufacturing a molded article according to claim 1, wherein the molded article is a seat.

11. The method for manufacturing a molded article according to claim 1, wherein a proportion of the thermosetting resin in the prepreg is 15 mass % or higher.

12. A method for manufacturing a molded article, comprising:
disposing a commingled yarn containing a continuous reinforcing fiber and a continuous thermoplastic resin fiber on a part of a surface of a prepreg, the prepreg containing continuous reinforcing fibers paralleling in at least one direction and a thermosetting resin impregnated between the continuous reinforcing fibers; and
heat-processing the prepreg with the commingled yarn after fixing the commingled yarn,
wherein a difference between the glass transition temperature of the thermoplastic resin constituting the continuous thermoplastic resin fiber and a glass transition temperature of the thermosetting resin is from 15 to 200° C.

13. The method for manufacturing a molded article according to claim 12, wherein a melting point of a thermoplastic resin fiber constituting the continuous thermoplastic resin fiber is higher than a curing temperature of the thermosetting resin, the melting point being a peak top temperature of an endothermic peak observed by differential scanning calorimetry during melting of a 1 mg sample of the thermoplastic resin fiber by heating the sample from room temperature to 300° C. at a heating rate of 10° C/min under a stream of nitrogen gas flowing at 30 mL/min.

14. The method for manufacturing a molded article according to claim 12, wherein a glass transition temperature of a thermoplastic resin fiber constituting the continuous thermoplastic resin fiber is lower than a curing temperature of the thermosetting resin, the glass transition temperature being measured by differential scanning calorimetry during heating of a 1 mg sample of the thermoplastic resin fiber to 300° C. at a heating rate of 10° C/min under a stream of nitrogen gas flowing at 30 mL/min, and followed by immediate cooling of the sample to room temperature or lower, heating again from room temperature to 300° C. at a heating rate of 10° C/min.

15. The method for manufacturing a molded article according to claim 12, wherein the prepreg comprises continuous reinforcing fibers paralleling bidirectionally, and a thermosetting resin impregnated between the continuous reinforcing fibers.

16. The method for manufacturing a molded article according to claim 12, wherein the thermosetting resin is an epoxy resin.

17. A method for manufacturing a molded article, comprising:
disposing a commingled yarn containing a continuous reinforcing fiber and a continuous thermoplastic resin fiber on a part of a surface of a prepreg, the prepreg containing continuous reinforcing fibers paralleling in at least one direction and a thermosetting resin impregnated between the continuous reinforcing fibers; and
heat-processing the prepreg with the commingled yarn after fixing the commingled yarn,
wherein the continuous thermoplastic resin fiber contained in the commingled yarn comprises a polyamide resin containing a structural unit derived from a diamine and a structural unit derived from a dicarboxylic acid, and 50 mol % or more of the structural unit derived from a diamine is derived from xylylenediamine and 50 mol % or more of the structural unit derived from a dicarboxylic acid is derived from an am-linear aliphatic dicarboxylic acid having from 4 to 20 carbons.

18. The method for manufacturing a molded article according to claim 17, wherein a difference between the glass transition temperature of the thermoplastic resin constituting the continuous thermoplastic resin fiber and a glass transition temperature of the thermosetting resin is from 15 to 200° C.

19. A composite material, comprising a commingled yarn containing a continuous reinforcing fiber and a continuous thermoplastic resin fiber, the commingled yarn being disposed on a part of a surface of a prepreg, the prepreg containing continuous reinforcing fibers paralleling at least unidirectionally and a thermosetting resin impregnated between the continuous reinforcing fibers, wherein the commingled yarn is fixed on the surface of the prepreg by using a thermoplastic resin fiber.

* * * * *

UNITED STATES PATENT AND TRADEMARK OFFICE
CERTIFICATE OF CORRECTION

PATENT NO. : 11,932,741 B2
APPLICATION NO. : 17/631272
DATED : March 19, 2024
INVENTOR(S) : Nobuhiko Matsumoto et al.

It is certified that error appears in the above-identified patent and that said Letters Patent is hereby corrected as shown below:

In the Claims

In Column 26, Claim 17, Line 49, delete "am-linear" and insert -- $\alpha,\omega$-linear --, therefor.

Signed and Sealed this
Twenty-first Day of January, 2025

Coke Morgan Stewart
*Acting Director of the United States Patent and Trademark Office*